United States Patent [19]

Hargis et al.

[11] Patent Number: 5,741,393
[45] Date of Patent: Apr. 21, 1998

[54] SOLVENTLESS CARBOXYLATED BUTADIENE-VINYLIDENE CHLORIDE ADHESIVES FOR BONDING RUBBER TO METAL

[75] Inventors: I. Glen Hargis, Tallmadge; Richard A. Miranda, Berlin Center; John A. Wilson, Akron, all of Ohio

[73] Assignee: GenCorp Inc., Fairlawn, Ohio

[21] Appl. No.: 535,596

[22] Filed: Sep. 28, 1995

Related U.S. Application Data

[62] Division of Ser. No. 239,079, May 6, 1994, Pat. No. 5,478,654.

[51] Int. Cl.[6] .................................................. C09J 5/02
[52] U.S. Cl. .................................... 156/307.5; 156/333
[58] Field of Search .................................. 524/259, 430; 428/457, 458, 460, 461; 156/307.5, 333

[56] References Cited

U.S. PATENT DOCUMENTS

| | | | |
|---|---|---|---|
| 4,119,587 | 10/1978 | Jazenski et al. | 524/104 |
| 4,336,171 | 6/1982 | Kohlstadt et al. | 524/510 |
| 4,483,962 | 11/1984 | Sadowski | 524/552 |
| 4,988,753 | 1/1991 | Rullmann et al. | 524/260 |
| 4,994,519 | 2/1991 | Scheer | 524/519 |
| 5,036,122 | 7/1991 | Auerbach et al. | 524/259 |
| 5,178,675 | 1/1993 | Sexsmith | 106/287.11 |
| 5,200,455 | 4/1993 | Warren | 524/413 |
| 5,200,459 | 4/1993 | Weih et al. | 524/459 |
| 5,281,638 | 1/1994 | Mowrey | 524/105 |

FOREIGN PATENT DOCUMENTS

| | | |
|---|---|---|
| 0 266 879 A1 | 5/1988 | European Pat. Off. . |
| 0 287 190 A3 | 10/1988 | European Pat. Off. . |
| 0 516 360 A1 | 12/1992 | European Pat. Off. . |
| 2 223 019 A | 3/1990 | United Kingdom . |
| WO 93/12189 | 6/1993 | WIPO . |

*Primary Examiner*—D. S. Nakarani
*Attorney, Agent, or Firm*—Robert F. Rywalski; Samuel B. Laferty

[57] ABSTRACT

An adhesive composition using as the primary binder an emulsion of butadiene-vinylidene chloride copolymer is disclosed. The composition is particularly suited for binding rubber to metal in a variety of uses such as vibration damping devices. The adhesive composition has resistance to hot water and or water glycol solutions.

10 Claims, No Drawings

SOLVENTLESS CARBOXYLATED BUTADIENE-VINYLIDENE CHLORIDE ADHESIVES FOR BONDING RUBBER TO METAL

This is a divisional application of U.S. application Ser. No. 08/239,079 filed May 6, 1994, now U.S. Pat. No. 5,478,654.

FIELD OF THE INVENTION

Our invention relates to a composition for bonding natural and synthetic elastomers to metallic and nonmetallic substrates under vulcanizing conditions, which composition comprises an aqueous dispersion, which contains an organic diene-vinylidene chloride based copolymer, an aromatic polynitroso compound and a coactivator and optionally contains conventional adhesion promoters, fillers and processing aids.

BACKGROUND OF THE INVENTION

U.S. Pat. No. 5,036,122 teaches adhesive compositions for bonding metals to rubbers based generally on polybutadiene latex said polybutadiene desirably having at least one halogen from the group of chlorine, bromine, or iodine. The composition further comprises a poly-C-nitroso compound and a polymaleimide. The adhesive (as explained in column 4, lines 26–39) is always applied over a primer or adhesive primer. The use of a primer implies that the adhesive does not inherently have good adhesion to the bare metal substrate during expected use conditions.

U.S. Pat. No. 5,200,459 teaches a poly(butadiene) latex prepared by emulsion polymerization in the presence of polyvinyl alcohol and a stabilizing solvent. The latex prepared according to this invention supposedly has less problems with coagulation due to the use of polyvinyl alcohol and a stabilizing solvent as a partial or total replacement for conventional surfactants.

Adhesives other than those of U.S. Pat. No. 5,036,122 are usually solvent-based and thus generate volatile organic emissions when used in the workplace.

The purpose of this invention was to create a water-based adhesive and a process using said adhesive capable of bonding metal to rubber formulations that does not require an organic primer or a separate priming step with said primer. Thus, it was desired to make a one package coating that requires only a single application over bare metal or phosphitized metal.

OBJECT OF THE INVENTION

It is an object of the present invention to provide an aqueous bonding composition which has universal utility for the bonding of rubbers of various types to metallic and nonmetallic substrates under vulcanizing conditions and which is comparable in performance to the known solvent-containing bonding compositions and avoids their disadvantages relating to release of volatile organics during drying and curing.

DESCRIPTION OF THE INVENTION

A bonding composition for bonding natural and synthetic elastomers to metallic and nonmetallic substrates under vulcanizing conditions, according to the invention, comprises an aqueous dispersion, which contains diene-vinylidene chloride based polymeric film-forming substance, an aromatic polynitroso compound and a coactivator and optionally contains conventional adhesion promoters, fillers and processing aids.

The film-forming substance used in the bonding composition in accordance with the invention result in a higher bond strength between the natural or synthetic elastomer (rubber) and the substrate without a need for an organic primer layer on said metal substrate.

When the bond deformation test, e.g. between rubber and metal, is tested using a peel deformation, the failure occurs within the rubber in most cases.

The bonding composition in accordance with the invention is an aqueous dispersion of a solid composition comprising a diene-based copolymer film-forming substances, desirably 50–150 parts by weight organic polynitroso compound, desirably 25–75 parts by weight of coreactive compound from the group consisting of triallylcyanurate and isocyanurate, diallylacrylamide, tetraallylterephthalamide, tris(1-methyl-2-propenyl) isocyanurate, trivinylisocyanurate, triallyltrimellitate, diallylphthalate, phenylene-bis-maleic acid imide, N,N'-m-phenylene dimaleimide (dimaleimide) ethyleneglycol-dimethacrylate, trimethylolpropanetrimethacrylate, and 1,3-butyleneglycoldimethacrylate, and 0 to 200 parts by weight of an adhesion promoter based upon 100 parts by weight of said diene-vinylidene chloride based polymeric film-forming substance. U.S. Pat. No. 5,036,122, which teaches how different rubber substrates can be used and effective amounts of the aromatic nitroso and bismaleimides, is hereby incorporated by reference. Desirably the adhesive composition is essentially free of high polymers (polymers above 30,000 number average molecular weight) other than the polymer of the diene-vinylidene chloride based latex wherein essentially free mean that less than 5, 10, 20 or 30 wt. % are included based on the diene-vinylidene chloride based polymer.

The diene-vinylidene chloride based polymeric film forming substance is made by polymerizing the monomers as listed below in a preferably aqueous media with conventional anionic surfactants. Poly (vinyl alcohol) is not a preferred surfactant and desirably poly (vinyl alcohol) is present in a very small amount or is absent. Desirably, the only halogen containing monomer used in the binder and/or coating is vinylidene chloride. A preferred way to make the diene-vinylidene chloride polymer is to prepare a seed latex from 1,3-butadiene, styrene and small amounts of an unsaturated mono or dicarboxylic acid and then use the seed latex in the polymerization of butadiene and vinylidene chloride. This is known as a seeded emulsion polymerization. The solids content at the end of the polymerization can be from 30 to 60 wt. % of the composition. The polymer composition is based on a total of 100 percent and should not exceed a total of 100 percent. The first monomer group of one or more conjugated dienes having from 4 to 5 carbon atoms and preferably being 1,3-butadiene, can be from 30–95 weight percent, desirably 30 to 90 weight percent, and preferably from 40 to 85 weight percent. The second monomer group of vinylidene chloride can be 5 to 70 weight percent, desirably 5 to 65 weight percent, and preferably 15 to 60 weight percent. The third monomer group of styrene and/or alkyl substituted styrene having 8 to 13 carbon atoms and desirably free of halogens or halogenated substituents can be up to 10 or 20 weight percent and desirably from 1 to 5 or 8 weight percent. The fourth monomer group of one or more other ethylenically unsaturated monomers having 3 to 12 carbon atoms and optionally having one or more heteroatoms of oxygen and/or nitrogen other than those described above can be up to 10 or 20 weight percent and preferably from 1 to 5 or 8 weight percent. Desirably, the other ethylenically unsaturated monomers include one or more unsaturated monomers with mono or dicarboxylic acid groups such as acrylic, methacrylic, or itaconic, and desirably these monomers are free of halogens or halogenated substituents. Desirably, the adhesive composition is free of chlorosulfonated polyethylene such as those containing from about 25 to 43 percent chlorine and from about 1 to 1.5 percent sulfur.

Suitable aromatic polynitroso compounds include poly(p-dinitrosobenzene) and compounds having one or more aromatic nuclei, to which two to four nitroso groups are bonded. These compounds may be provided at their nuclei with other substituents. Examples of suitable compounds are : m-dinitrosobenzene, p-dinitrosobenzene, m-dinitrosonaphthalene, p-dinitrosonaphthalene , 2,5-dinitroso-p-cymene, 2-methyl-1,4-dinitrosobenzene, 2-methyl-5-chloro-,1,4-dinitrosobenzene, 2-fluoro-1,4-dinitrosobenzene, 2-methoxy-1,3-dinitrosobenzene, 5-chloro-1,3-dinitrosobenzene, 2-methoxy-1,3-dinitrosobenzene, 2-benzyl-1,4-dinitrosobenzene and 2-cyclo-hexyl-,1,4-dinitrosobenzene.

The use of poly(p-dinitrosobenzene or poly(1,4-dinitrosonaphthalene) is preferred in bonding composition in accordance with the invention.

The compounds mentioned may include additional substituents attached to the nucleus. The nitroso compounds may be replaced by the corresponding oximes together with oxidants, such as vulcanization accelerators, chromate or dichromate, or the corresponding nitro compounds together with reducing agents, such as barium oxide, may be used.

The bonding composition in accordance with the invention, may also contain conventional adhesion promoters, such as carbon black, silica, calcium carbonate, oxides of the metals Al, Ca, Zn, Mg, Pb, Zr, also zirconium salts, e.g. zirconium aluminate, lead salts of inorganic and/or organic acids, e.g. basic lead carbonate, polyhydric alcohol, such as pentaerythritol, organic peroxides, e.g. dicumyl peroxide, organo functional silanes, e.g. gamma-aminopropyltriethoxysilane, and adhesion-promoting resins, e.g. phenol formaldehyde resins, individually or in mutual mixtures.

According to the invention, the coactivator is a coreactive compound of the group consisting of triallylcyanurate and isocyanurate, diallylacrylamide, tetrallylterephthalamide, tris(1-methyl-2-propenyl) isocyanurate, trivinylisocyanurate, triallyltrimellitate, diallylphthalate, phenylene bis-maleic acid imide, 1,1-(methylenedi-4,1-phenylene bismaleimide)ethyleneglycol dimethacrylate, trimethylolpropanetrimethacrylate, and 1,3-butyleneglycol dimethacrylate.

Preferred dispersing agents are used to form stable dispersions. They include addition products of alkylphenols, such as nonylphenol, and ethylene oxide, fatty alcohol or a fatty alcohol partial ester of phosphoric acid. The dispersion may additionally be stabilized with polyvinylalcohol or Polywet™ or water-soluble colloids, such as methylcellulose, methylhydroxyl-propylcellulose or hydroxyethylcellulose. As previously recited the use of poly (vinyl alcohol) is discouraged in these formulations.

The bonding composition in accordance with the invention may be used to bond various types of rubber (also known as elastomers both in crosslinked and non-crosslinked form) in a very wide range under vulcanizing conditions, such as natural rubber, polychloroprene rubber, styrene-butadiene rubber, nitrile rubber, rubber comprising an ethylene-propylene copolymer or an ethylene-propylene-diene terpolymer.

The substrate may consist of metallic or nonmetallic materials, such as steel, stainless steel, which may have been surface-treated, i.e. phosphitized, also aluminum, copper, brass, bronze, nickel, zinc and their alloys, also nonmetallic materials, such as glass, woven fabrics made of glass fibers or of natural or synthetic organic molding compositions consisting of phenolic resins. A preferred substrate is steel which has the substrate surface grit blasted with/without phosphate conversion or coating (i.e., phosphate-based corrosion inhibitor coatings, phosphitized). These phosphate inhibitor coatings are desirably completely inorganic and thus exclude phenolic or other organic binders.

The bonding composition in accordance with the invention desirably contains between 12 and 50 percent by weight solids and desirably has a viscosity of about 10 to 1000 centipoise (Pa.s) for ease of applications and can be applied to the substrate or rubber surfaces by conventional methods, such as brushing, spraying, roll-coated and dipping. The surface areas of the metal substrate and rubber which are going to be bonded by the adhesive are the interfacial bond areas. Thus, only one surface, optionally both, are covered by the adhesive. After the coating has been applied and dried, the surfaces of the interfacial bond areas are contacted with each other and the bond is formed under vulcanizing conditions which includes the applying of heat and optionally pressure.

Organic solvents may be co-used in minor amounts, which should not exceed 15 percent and are desirably not present.

The advantages afforded by the bonding composition in accordance with the invention resides in that it can be prepared in a simple manner, has a long shelf-life, and does not require an organic primer layer on the metal substrate. This saves the time for application and drying steps of the primer. The adhesive has a universal utility for use with general purpose and specialty types of rubber and various substrate materials, and that the resulting bond has a high resistance to corrosive influences, to elevated temperatures, and to boiling water. Being water-based, it has low or near zero volatile organic emissions during drying (less than 1.0, 0.5, 0.1, or 0.05 wt. % volatile organics in said coating composition). The laminates are useful as components in vehicle vibration control products that have elastomer to metal interfaces.

EXAMPLES

1. Rubber and Substrates

The rubber compound for bonding to the metal substrate is shown in Table 1 is useful in engine mount applications. It is cured with a conventional sulfur-based cure system; cure conditions are 160° C. for 10 minutes. The resulting vulcanizate has a Shore A hardness of 58.

The metals, for bonding to rubber, were cold-rolled steel coupons (1"×2.5" equiv. to 2.5×6.4 cm) treated with calcium modified zinc phosphate coating. The adhesive was either sprayed or brushed onto the metal surfaces. For one-coat brush applications film thicknesses ranged from 0.0007 inch to 0.0009 inch (0.0018 to 0.0023 cm).

2. Preparation of Carboxylated Butadiene-Vinylidene Chloride Latexes

The latex, which is the film forming polymer of the adhesive system, is prepared by emulsion polymerization of butadiene and vinylidene chloride using a seed latex of styrene and itaconic acid (optionally styrene with both itaconic and methacrylic acids), as shown in Tables II and III. The polymerization is carried out at 65° C. for 22 hrs. The presence of residual monomer in the final latex is essentially eliminated by carrying out the copolymerization to 100 percent conversion of monomers to polymer. The anionic surfactant system is a combination of Dowfax 2A1 (sodium diphenyloxide sulfonate) and Monawet MB-45 (dibutyl sodium sulfosuccinate), present at 0.14 and 1.0 weight percent, respectively, based on the total weight of the diene-based copolymer. In this application, the term copolymer is used for a polymer made from two or more types of monomers.

The butadiene (Bd) content of the medium Bd content latex of Table II, is 42 percent. This compares to a butadiene content of 85 percent for the experimental latex (designated high Bd), shown in Table III. At room temperature of the high Bd content copolymer, having a glass transition temperature of –78° C., provides a more flexible film compared to medium Bd content latex with a glass transition temperature of –4° C. The nonpolar butadiene segments of the copolymer are expected to have some degree of affinity for the nonpolar rubber surface.

The polar vinylidene chloride segments in the copolymer are capable of promoting the wetting of the metal surface which has a high surface energy.

3. Adhesive Composition

The adhesive is an aqueous dispersion of a copolymer of butadiene and vinylidene chloride, an effective amount of aromatic polynitroso compound, an effective amount of coactivator and fillers. The adhesive compositions containing the latexes of Tables II and III are shown in Tables IV and V.

The poly-carbon-nitroso compound is poly(para-dinitrosobenzene), designated as PDNB. PDNB functions to chemically crosslink the latex copolymer with itself and to the NR substrate during the vulcanization process. PDNB is incorporated into the adhesive composition by addition as a 50 percent dispersion in water. The nitroso compound may be replaced by the corresponding oxime or the corresponding nitro compound with the appropriated oxidation/reduction agent.

The coactivator is preferably a polymaleimide compound, preferably 1,1-(methylenedi-4,1i-phenylene bismaleimide). Its purpose is to improve the crosslinking of the butadiene-vinylidene chloride copolymer and result in higher bond strength between the copolymer and NR substrate.

Conventional adhesion promoters, such as carbon black, are present to provide reinforcement and impart a desired color to the adhesive. Zinc oxide may participate in ionic bond formation with the carboxylic groups of the latex. The resulting ionic domains may enhance mechanical strength.

To form a more stable dispersion, the water-based adhesive contains an anionic dispersant, Polywet™ Z1766 (sodium salt of a polyfunctional oligomer, supplied by Uniroyal Chemical Co.), and a nonionic dispersing agent, Natrosol® 250LR (hydroxyethyl cellulose supplied by Aqualon Corp.).

4. Testing

Adhesion testing was carried out at room temperature with an Instron Tester. Compression molded rubber-to-metal parts were peeled at a rate of 2 inches/minute at a 90° peel angle, according to ASTM D429, Method B for uncured rubber. The maximum peel force and the percent rubber retained on a one square inch surface were recorded. Environmental testing included immersion of molded samples, with the bond line exposed, in boiling water for 2 hours and in a aqueous solution of ethylene glycol (70%) for 24 hours at 120° C.

EXAMPLE 1

A. Preparation of the Adhesive from High Bd Content Latex

1. Deionized water (220 g) was placed in ball mill jar, followed by Natrosol™ 250LR (2.0 g), Polywet™ Z 1766 (2.0 g), Benzoquinone (0.2 g) and HVA-2 (1'-(methylene-di-4,1-phenylene) bismaleimide, supplied by DuPont Chemical Co.) (9.2 g).

2. Aqueous dispersions of 37.5 g AquaBlack® (40 weight percent), 17 g Zeeox® (60 percent zinc oxide in water) and 51 g PDNB (poly (para-dinitrobenzene) 50 percent paste in water supplied by MLPC International) were added to the materials of A.1. above. The ball mill jar was rotated for 5 hours. The resulting dispersion was a finely divided black dispersion, designated as the curative masterbatch.

3. A 36 g aliquot of the curative masterbatch was added to a clean container with a stirring bar, then 7.4 g of the high Bd content latex of Table III was slowly added while stirring. The final adhesive composition, shown in Table V, contains 23 weight percent solids and 77 weight percent water.

4. Similarly prepared was the adhesive from the medium Bd content latex of Table II.

B. Applying the Adhesive

Because the adhesive contains dispersed solids in water, it is necessary to adequately agitate the mixture prior to use. The adhesive compositions were applied to phosphated metals by brush, an air gun, or an airless spray gun. To decrease drying time, the metals may be preheated to 60° C.

C. Curing of Rubber and Adhesive

The metals coated with the adhesives and uncured NR substrate of Table I are brought together and compression molded at 30,000 lbs. (66,000 kg) ram force spread over six test specimens of dimensions 1"×2.5" (2.5×6.4 cm) and heated for 10 minutes at 160° C.

EXAMPLE 2

Rubber-to-metal parts were prepared by bonding the uncured NR compound of Table I with two experimental adhesives of Tables III and V and with two comparative water-based adhesives (Chemlok™ 855 and 828/805, supplied by the Lord Corporation). Chemlok™ 855 is a one-pack adhesive and 828/805 (cover/primer) is a two-pack system. The data is given in Table VII. In addition, two widely used solvent-based rubber-to-metal adhesive systems (Chemlok™ 252/205 and Thixon™ 508/P-15) were tested for comparative purposes. The bonded parts were tested according to ASTM D429-B. The maximum force during stripping and the percent rubber retained on the metal surface (on a 2.5×2.5 cm or 1"×1") after stripping is also shown in Table VI. A high percentage of rubber retained is desirable, since this indicates that the bond is stronger than the rubber itself. The test resulted in 165 lbs./in. (29.5 kg/cm), with 97 percent rubber retention, for the high Bd content adhesive system. This compares to 122 lbs./in. for the next best performing adhesive (Chemlok™ 828/805), which is a two-pack adhesive system and thus uses an organic primer coat between the adhesive and the metal substrate. The peel adhesive strength of the experimental medium Bd content system was 77 lbs./in. (13.8 kg/cm), which is lower than the high Bd content counterpart and higher than Lord Corporation's one-pack adhesive, Chemlok™ 855. Thus, the data of Table VI indicates that a highly effective bond can be produced by utilizing the latex-based adhesives of this disclosure. These experimental latex-based adhesives are comparable in performance to prior art adhesive/primer compositions and show higher peel strength than a commercial water-based primerless adhesive.

EXAMPLE 3

It is important that water-based adhesive systems for bonding rubber-to-metal in bushings for automobiles have resistance to hot water and hot glycol. In testing for environmental resistance, the rubber of the bonded part is tied back over the metal with stainless steel wire and the bond line is scored with a razor blade to expose the bond line to the environment. Parts bonded with our medium Bd content adhesive of Table IV immersed in boiling water for 2 hours and physically peeled showed 100 percent rubber retention on the test metal part. The samples shown in Table VII were immersed in hot aqueous solution of ethylene glycol (70%) for 24 hours at 120° C. The percent rubber retained on the peeled metal coupons was 100 percent for both the high Bd content and Chemlok™ 828/805 adhesive systems. For the medium butadiene-based adhesive of Table IV, the percent rubber retained was 50 percent. These results are a good indication that parts bonded with medium or high butadiene-based adhesives have good retention of adhesion in boiling water while the high Bd content adhesive of Table V are especially resistant to attack by hot glycol.

EXAMPLE 4

Adhesives were prepared generally according to the recipes outlined in Example 1 and Tables IV and V to compare a commercial polybutadiene latex without vinylidene chloride to the medium butadiene latex of Table II. This was to determine the effect of the vinylidene chloride on the adhesive properties. The results are shown in Table VIII wherein the commercial polybutadiene-based adhesive only had a peel strength of 9.3 kg/cm as compared to 19.3 kg/cm for the adhesive using the butadiene-vinylidene chloride polymer. The percent rubber retained on the metal substrate was also significantly lower for the polybutadiene without vinylidene chloride based adhesive.

TABLE I

NATURAL RUBBER FORMULATION

| MATERIAL | phr |
|---|---|
| Natural Rubber, SMR-GP | 100 |
| Carbon Black, N550 | 42 |
| Carbon Black, N990 | 10 |
| Naphthenic Oil | 6 |
| Zinc Oxide | 6 |
| Stearic Acid | 5 |
| Santoflex 13 | 0.5 |
| PVI | 0.2 |
| MBT | 0.3 |
| MBTS | 0.3 |
| CBS | 0.4 |
| Sulfur | 3.0 |

Curing conditions: 10 minutes at 160° C.
Shore A Hardness = 58
PVI is N-(cyclohexylthio)phthalimide
MBT is 2-Mercaptobenzothiazole
MBTS is Benzothiazyl disulfide
CBS is N-cyclohexyl-2-benzothiazylsulfenamide

TABLE II

COMPOSITION OF MEDIUM BUTADIENE CONTENT LATEX

| COMPONENT | WEIGHT PERCENT |
|---|---|
| Vinylidene Chloride | 50 |
| Butadiene | 42 |
| Styrene | 3.5 |
| Methacrylic Acid | 3.0 |
| Itaconic Acid | 1.5 |
| Dowfax 2A1 | 0.14 |
| Monawet MB-45 | 1.0 |

Properties:
% solids = 52
% gel = 75
pH = 8.3
Tg, °C. = −4

TABLE III

COMPOSITION OF HIGH BUTADIENE LATEX

| COMPONENT | WEIGHT PERCENT |
|---|---|
| Butadiene | 85 |
| Vinylidene Chloride | 10 |
| Styrene | 3.4 |
| Itaconic Acid | 1.6 |
| Dowfax 2A1 | 0.14 |
| Monawet MB-45 | 1.0 |

Properties:
% solids = 39
pH = 7.0
Viscosity = 13 cps
Tg, °C. = −78

TABLE IV

COMPOSITION OF MEDIUM BUTADIENE CONTENT WATER-BASED ADHESIVE

| COMPONENT | WEIGHT PERCENT |
|---|---|
| Vinylidene Chloride | 4.0 |
| Butadiene | 3.4 |
| Styrene | 0.55 |
| Methacrylic Acid | 0.45 |
| Itaconic Acid | 0.22 |
| CURATIVES: | |
| PDNB | 5.2 |
| HVA-2 | 2.5 |
| ADDITIVES/PROMOTERS: | |
| Zinc Oxide | 3.0 |
| Carbon Black | 2.7 |
| Benzoquinone | 0.05 |
| DISPERSANTS: | |
| Polywet ® Z1766 | 0.5 |
| Natrosol ® 250LR | 0.5 |
| WATER: | 77.0 |

Percent solids = 23%

TABLE V

COMPOSITION OF HIGH BUTADIENE CONTENT WATER-BASED ADHESIVE

| COMPONENT | WEIGHT PERCENT |
|---|---|
| Vinylidene Chloride | 0.6 |
| Butadiene | 5.7 |

TABLE V-continued

COMPOSITION OF HIGH BUTADIENE CONTENT WATER-BASED ADHESIVE

| COMPONENT | WEIGHT PERCENT |
|---|---|
| Styrene | 0.2 |
| Itaconic Acid | 0.1 |
| CURATIVES: | |
| PDNB | 6.7 |
| HVA-2 | 2.3 |
| ADDITIVES/PROMOTERS: | |
| Zinc Oxide | 2.5 |
| Carbon Black | 3.5 |
| Benzoquinone | 0.05 |
| DISPERSANTS: | |
| Polywet ® Z 1766 | 0.5 |
| Natrosol ® 250LR | 0.5 |
| WATER: | 77.0 |

Percent solids = 23%

TABLE VI

COMPARISON OF 90° PEEL DATA FOR BONDING UNCURED NATURAL RUBBER TO PHOSPHATED METAL WITH WATER- AND SOLVENT-BASED ADHESIVES

| ADHESIVE SYSTEM | PEEL STRENGTH, 90° (lbs/in, Maximum) | PERCENT RUBBER RETAINED ON METAL |
|---|---|---|
| WATER-BASED: | | |
| High Bd Latex | 165 | 97 |
| Chemlok ™ 828, cover Chemlok ™ 805, primer | 122 | 100 |
| Medium Bd latex | 77 | 95 |
| Chemlok ™ 855 | 62 | 95 |
| SOLVENT-BASED: | | |
| Chemlok ™ 252, cover Chemlok ™ 205, primer | 69 | 100 |
| Thixon ™ 508, cover Thixon ™ P-15, primer | 76 | 100 |

TABLE VII

GLYCOL IMMERSION DATA FOR MOLD BONDED SAMPLES

| ADHESIVE SYSTEM | % RUBBER RETAINED ON METAL (appearance of metal surface) |
|---|---|
| Medium Bd Latex | 50% (ROUGH SURFACE) |
| HIGH Bd Latex | 100% (SMOOTH SURFACE) |
| CHEMLOK ® 828/805 | 100% (SMOOTH SURFACE) |

Rubber peeled from metal with pliers.

TABLE VIII

Comparison of 90° Peel Data for Adhesives from Poly(butadiene) and Poly(butadiene-vinylidene chloride)

| LATEX IN ADHESIVE | % RUBBER RETAINED ON METAL | PEEL STRENGTH Max lbs/in, Max kg/cm |
|---|---|---|
| Poly(butadiene) | 60% | 52 (9.29) |
| Poly(butadiene-vinylidene chloride) of Table II | 85–90% | 108 (19.30) |

While in accordance with the patent statutes the best mode and preferred embodiment has been set forth, the scope of the invention is not limited there-to, but rather by the scope of the attached claims.

What is claimed is:

1. A process for using a water-based adhesive for adhering a metal substrate to a crosslinked or crosslinkable rubber composition having an interfacial bond area, comprising:
   (a) supplying a metal substrate or phosphitized metal substrate having an interfacial bond area to which no organic coating has been applied prior to step (b),
   (b) applying a water-based adhesive coating to at least a portion of the interfacial bond area of said crosslinked or crosslinkable rubber composition and/or to at least a portion of the interfacial bond area of said metal substrate forming one or more coated workpieces,
   said water-based adhesive coating comprising:
   (1) a diene-vinylidene chloride polymer in the form of a water-based latex, said diene-vinylidene chloride polymer having 30 to 95 weight percent of its repeat units from conjugated dienes which are free of halogens and have from 4 to 6 carbon atoms; 5 to 70 weight percent of its repeat units from vinylidene chloride; up to 20 weight percent of repeat units from styrene or alkyl substituted styrene; and up to 20 weight percent of repeat units from other ethylenically unsaturated monomers having from 3 to 12 carbon atoms, and optionally containing one or more oxygen and/or nitrogen atoms,
   (2) from 50 to 150 parts by weight of one or more aromatic polynitroso compounds,
   (3) from 25 to 75 parts by weight of one or more bismaleimides,
   (c) drying said one or more coated workpieces,
   (d) contacting said interfacial bond areas of said metal substrate and said rubber composition at least one of which is a coated workpiece and simultaneously or subsequently applying heat to form a bond between said rubber composition and said metal substrate wherein said parts by weight are based on 100 parts by weight of said diene vinylidene chloride polymer.

2. A process according to claim 1 wherein said diene-vinylidene chloride polymer has as its repeat units 30 to 90 weight percent units from said conjugated dienes wherein each diene has 4 to 5 carbon atoms, 5 to 65 weight percent units from said vinylidene chloride, up to 10 weight percent units from said styrene or said alkyl substituted styrene, and wherein said up to 10 weight percent units of said other ethylenically unsaturated monomers includes at least one mono or dicarboxylic acid and wherein said vinylidene chloride is the only halogenated monomer in said diene-vinylidene chloride polymer.

3. A process according to claim 2, wherein said water-based adhesive includes 25 to 75 parts by weight carbon black and 20 to 80 parts by weight of zinc oxide per 100 parts by weight of said diene-vinylidene chloride polymer.

4. A process according to claim 3 wherein said conjugated diene comprises butadiene.

5. A process according to claim 4 wherein said metal substrate is steel.

6. A process according to claim 3 wherein said diene-vinylidene chloride polymer has as its repeat units 30 to 90 weight percent units from 1,3-butadiene, 5 to 65 weight percent units derived from said vinylidene chloride, 1 to 10 weight percent units derived from styrene and 1 to 5 weight percent units of said other ethylenically unsaturated monomers.

7. A process according to claim 6, wherein said metal substrate is steel.

8. In a process for adhering a metal substrate to a crosslinked or noncrosslinked elastomer at an interfacial bond area using an adhesive composition comprising a polymeric binder, curatives, and adhesion promoters, wherein the improvement comprises the polymeric binder including a water-based latex, said water-based latex being the reaction product from the copolymerization of at least 30 to 95 weight percent conjugated dienes free of halogens and having 4 to 6 carbon atoms, 5 to 70 weight percent vinylidene chloride, up to 20 weight percent styrene or alkyl substituted styrene, and up to 20 weight percent other ethylenically unsaturated monomers having from 3 to 12 carbon atoms, and wherein the interfacial bond area of the metal substrate bonded by the adhesive is a bare metal free of any organic primer coating other than said adhesive and an optional inorganic phosphate corrosion inhibitor.

9. In a process according to claim 8 wherein the adhesive composition has less than 30 weight percent of polymers of number average molecular weight above 30,000 other than said water-based latex based upon the solids of said water-based latex.

10. In a process according to claim 8 wherein the polymeric binder is the reaction product of at least 30 to 90 weight percent butadiene, 5 to 65 weight percent of said vinylidene chloride, and 1 to 10 weight percent styrene, and wherein said adhesive composition is free of halogenated monomers other than said vinylidene chloride.

* * * * *